May 11, 1926.
G. B. BURNHAM
1,584,166
APPARATUS FOR SEPARATING SOLIDS FROM LIQUIDS
Filed Sept. 24, 1924    2 Sheets-Sheet 1
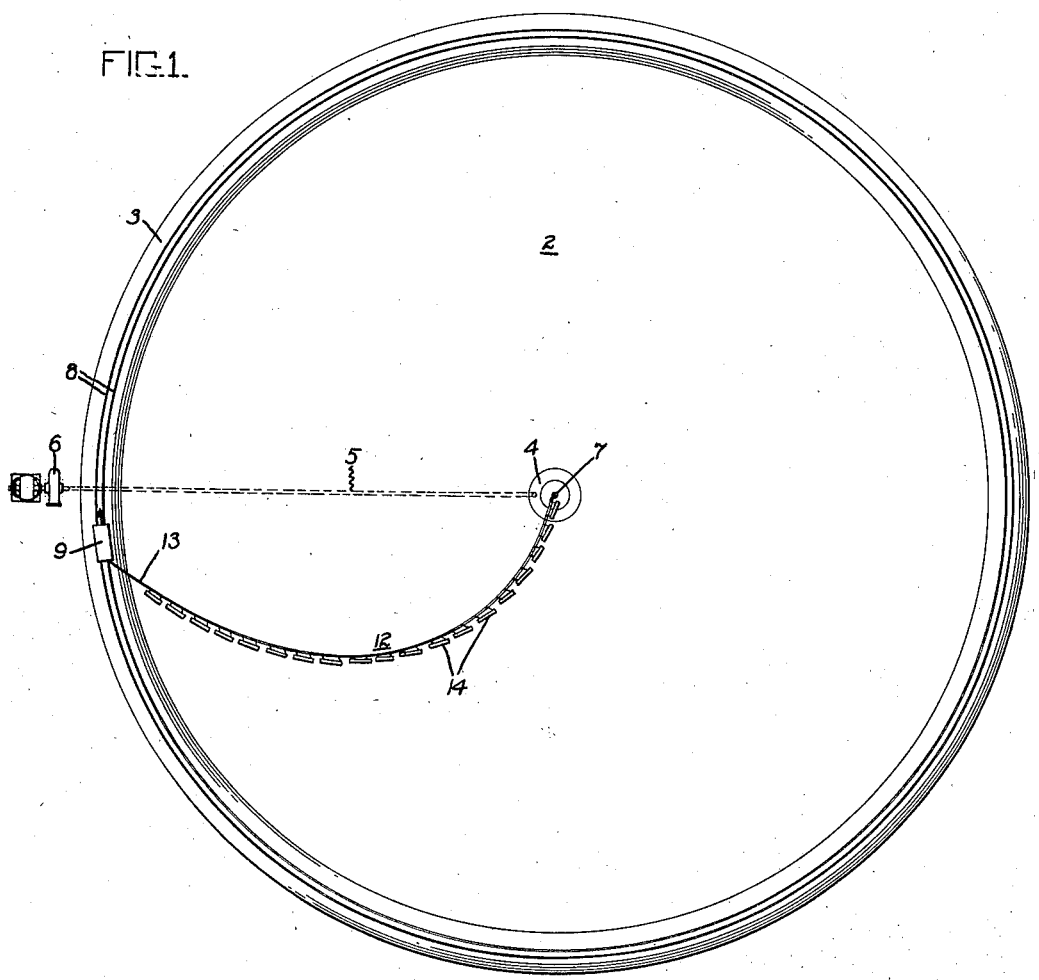
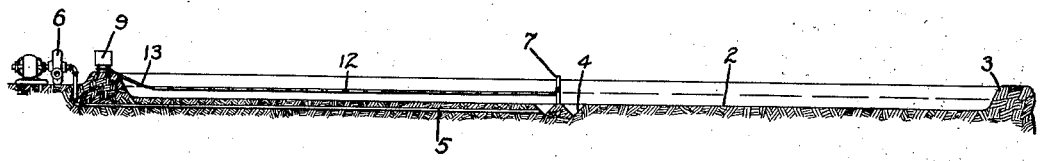
INVENTOR
George B. Burnham.
BY White ...... Evans
HIS ATTORNEYS.

May 11, 1926. 1,584,166
G. B. BURNHAM
APPARATUS FOR SEPARATING SOLIDS FROM LIQUIDS
Filed Sept. 24, 1924  2 Sheets-Sheet 2
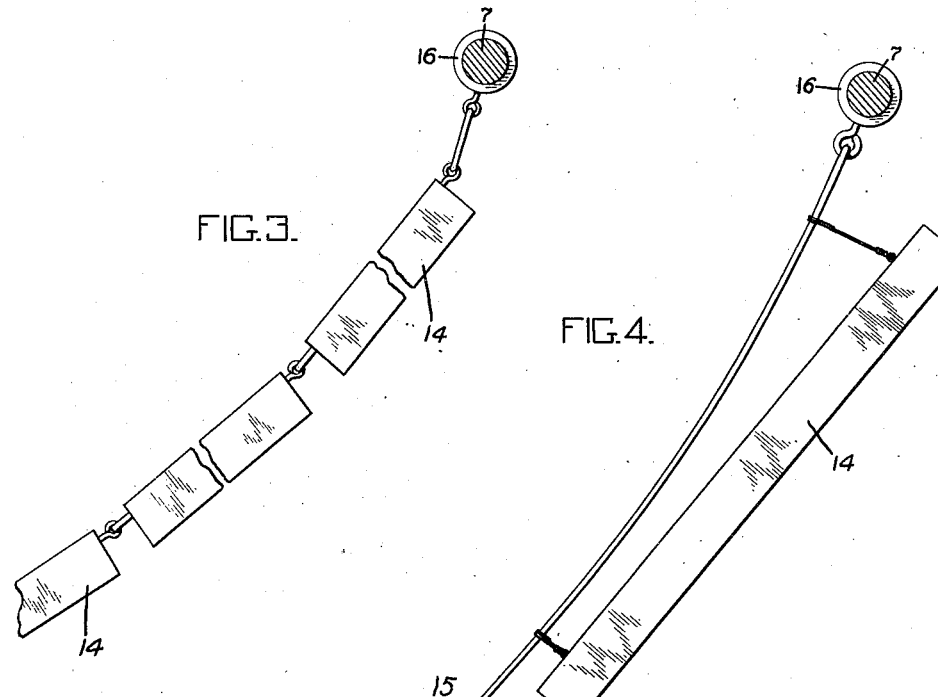
FIG.3.
FIG.4.
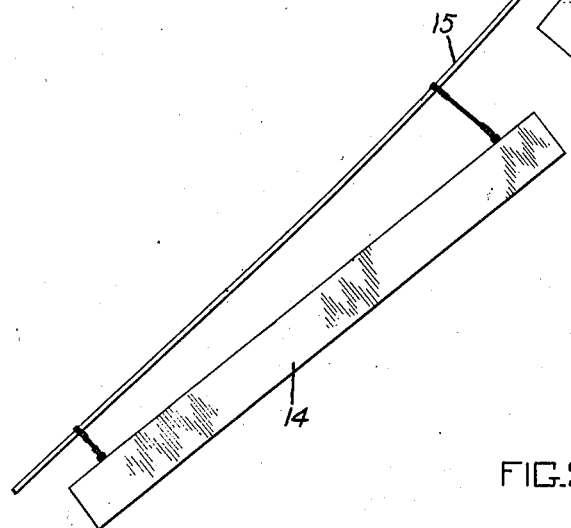
FIG.5.
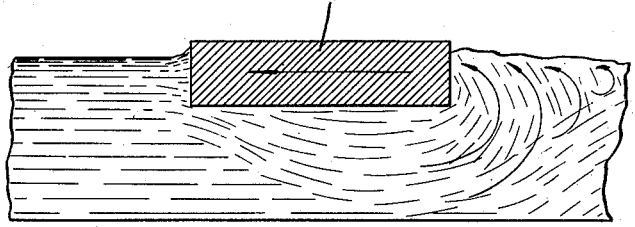
INVENTOR
George B. Burnham.
BY White Print Evans
HIS ATTORNEYS.

Patented May 11, 1926.

1,584,166

UNITED STATES PATENT OFFICE.

GEORGE B. BURNHAM, OF RENO, NEVADA, ASSIGNOR TO BURNHAM CHEMICAL COMPANY, OF RENO, NEVADA, A CORPORATION OF NEVADA.

APPARATUS FOR SEPARATING SOLIDS FROM LIQUIDS.

Application filed September 24, 1924. Serial No. 739,743.

The invention relates to an apparatus for separating solids from a liquid and particularly solids which have a specific gravity approximating that of the liquid in which the solids are contained, so that upon agitation of the liquid, the solids remain in suspension for an appreciable interval of time, so that they may be moved toward a selected point by causing a movement of the agitated liquid toward such point.

An object of the invention is to provide an apparatus for separating solids from a liquid, the specific gravity of the solids being only slightly greater than the specific gravity of the liquid.

Another object of the invention is to provide an apparatus for separating crystals of salts from the brine from which they crystallized.

A further object of the invention is to provide an apparatus capable of handling large volumes of liquids so that the solids may be separated and recovered in economic time and at an economic cost.

The invention possesses other advantageous features, some of which, with the foregoing, will be set forth at length in the following description, where I shall outline in full that form of my invention which I have selected for illustration in the drawings accompanying and forming part of the present specification. In said drawings I have shown one form of apparatus embodying my invention, together with a modification thereof, but it is to be understood that I do not limit myself to such form, since the invention, as set forth in the claims, may be embodied in a plurality of other forms.

Referring to said drawings:

Figure 1 is a plan view of an apparatus embodying my invention.

Figure 2 is a cross section of the apparatus shown in Figure 1.

Figure 3 is a detail of a portion of the movable boom or inverted weir, which is moved through the liquid to produce agitation thereof.

Figure 4 is a fragment of a modified form of movable boom or inverted weir.

Figure 5 is a diagrammatic representation of the effect produced by the movement of the boom or inverted weir through the liquid.

The apparatus is particularly useful in separating crystals from the brine from which the crystals have been formed. By the use of the apparatus, the crystals in the liquid are placed in a state of suspension, due to the agitation of the liquid and such agitation is in a direction to cause the suspended crystals to be moved toward a selected point, so that by continued use of the apparatus, the crystals are accumulated at the selected point. In the recovery of salt from the saline waters of lakes, such as Searles Lake in California, the brine or liquor, after having been concentrated by evaporation, is introduced into ponds in which the salts are crystallized out from the liquor and the present apparatus is employed for recovering the crystallized salt. It is to be understood, however, that the apparatus is not limited for use in connection with the accumulation and recovery of crystals but may be used in connection with the separation and recovery from a liquid, of any solid particles, which may be placed in suspension by agitation of the liquid.

The apparatus comprises a container, preferably in the form of a large circular pond 2, which pond is preferably formed by throwing up a circular dyke 3, extending above the plane of the surrounding terrain. The pond should preferably be larger in diameter, and in one device which I have constructed in accordance with this invention, the pond is 575 feet in diameter. The pond is shallow, preferably not more than 4 feet in depth, and brine is introduced into the pond until it acquires a depth of from ½ foot to 2 feet in the pond. Formed at the center of the pond is a sump 4 into which the suction pipe 5 of the pump 6 extends. At the center of the sump there is arranged a vertical post or support 7. The dyke 3 is preferably provided with a trackway 8 and a tractor or locomotive 9 operates on the trackway.

Means are provided for agitating the liquid in the pond in such manner as to place the solids in suspension and to produce currents in the direction of the sump 4. Connected to the central support 7 and extending to the tractor 9 is a boom or agitator 12 which is partially submerged in the liquid, the bottom edge of the boom or agitator, being spaced away from the bottom of the pond. In practice I have found that a submersion of from 1 to 3 inches of the lower surface of the inverted weir is sufficient to produce excellent results. The agitator is preferably made of wooden boards or logs hinged together and floating in the pond, the inner end of the string of boards being connected to the support 7 and the outer end being connected to the tractor 9 by a cable 13. The agitator is preferably flexible and of greater length than the radius of the pond, so that as the tractor 9 draws the agitator around the pond, the agitator assumes a concave shape, all parts of the weir being at an angle to the radius of the pond. Because of the angle of the weir or the boards which form the agitator, a current is created in the wake of the agitator as it is drawn through the pond, and this current is in the direction of the center of the pond. The agitation of the liquid caused by the movement of the weir, places the solids in suspension and the current formed by the movement of the agitator causes the suspended particles to move inward toward the center of the pond. The particles may be moved inward only a short distance for each rotation of the agitator, but as the agitator continues to rotate, the particles are moved in a step by step movement toward the center so that eventually they accumulate at the center. The movement of the agitator through the liquor produces eddy currents which place the solids in suspension and due to the angularity of the boards of the agitator, the eddy currents tend generally in the direction of the center of the pond, thus causing the suspended particles to be carried toward the center of the pond. After the agitator passes a given point in the pond, the liquid again becomes quiescent and the suspended particles settle to the bottom at a point closer to the center than their previous location. Since the pond is very large with respect to its depth and since the tractor moves slowly, making a revolution about once in three minutes, the agitation in the pond is local and has an opportunity of subsiding before the agitator again passes over the same point. The boards 14 which form the agitator, are preferably hinged or linked together as shown in Figure 3, but when desired the boards 14 may be attached to a cable 15 which extends from the swivel 16 on the center post to the tractor. When this construction is employed, the outer end of each board is preferably disposed closer to the cable than the inner end, so that each board is disposed at an angle to the radius, with the inner end of the board lagging behind the outer end of the board. This arrangement is also accomplished by the method of connection shown in Figure 3 and produces an inward current in the wake of the board as the agitator is moved through the pond.

I have found that excellent results are obtained by forming the boards 14, which lie adjacent the center of the pond, of larger cross section than those which lie adjacent the periphery of the pond. The agitator has a greater velocity adjacent the periphery of the pond, so that the smaller boards at the periphery will stir up the liquor sufficiently to place the solids in suspension, thereby relieving the load on the tractor. The boards adjacent the inner end of the agitator, due to the slow movement of this end of the weir, should preferably be larger in cross section to obtain the desired agitation of the liquid.

In operation, the pond is filled with liquid to the desired depth and then the tractor is placed in operation to drag the floating inverted agitator around the pond, causing a gradual progression of the solids toward the center of the pond. When a super-saturated solution of brine is introduced into the pond, the agitation caused by the moving agitator is sufficient to cause crystallization of some of the salts and then these salts are accumulated at the center by the apparatus. This involves an apparently novel process of recovering crystals from brine and such process will be covered in an application for Letters Patent to be filed subsequently.

I claim:

1. An apparatus for separating solids from a liquid comprising a relatively shallow container of large diameter for containing the mixture of solids and liquid, and means floating in the liquid adapted to be moved to agitate the liquid to cause the solids to be urged toward a selected point in the container.

2. An apparatus for separating solids from a liquid comprising a relatively shallow container of large diameter for containing the mixture of solids and liquid and means in the liquid and spaced from the bottom of the container adapted to be moved to locally agitate and to cause movement of a portion of the liquid toward a selected point in the container.

3. An apparatus for separating solids from a liquid comprising a relatively shallow container of large diameter for containing the mixture of solids and liquid, an articulated agitator in the container and means for moving the agitator to cause currents in the liquid.

4. An apparatus for separating solids from a liquid comprising a relatively shallow container of large diameter for containing the mixture of solids and liquid, an agitator in the container and means for moving the agitator circumferentially in the container to set up local agitation of said liquid, 5. An apparatus for separating solids from a liquid comprising a container for receiving the liquid mixture, a floating agitator in said container, and means for moving said agitator at a greater velocity at one end than at the other end to locally agitate said liquid.

6. An apparatus for separating solids from a liquid comprising a relatively shallow container of large diameter for containing the solids and liquid, an elongated agitator disposed at an angle to the radius of the container and extending from adjacent the center to adjacent the periphery of the container and means for moving the agitator circumferentially in the container.

7. An apparatus for separating solids from a liquid comprising a relatively shallow container of large diameter for containing the solids and liquid, curved agitator extending from adjacent the center to adjacent the periphery of the container and means for moving the agitator circumferentially in the container.

8. An apparatus for separating solids from a liquid comprising a relatively shallow container of large diameter for containing the solids and liquid and means in the liquid and spaced from the bottom of the container and extending from adjacent the center to adjacent the periphery of the container adapted to be moved to cause local currents in the liquid toward the center.

9. An apparatus for separating solids from a liquid comprising a container for receiving the liquid mixture, an elongated agitator in said container, and means for moving said agitator to agitate said liquid, the advancing edge of said agitator being disposed angularly to its direction of movement.

10. An apparatus for separating solids from a liquid comprising a relatively shallow container of large diameter for containing the mixture of solids and liquid, an agitator extending from adjacent the center to adjacent the periphery of the container and means connected to the outer end of the agitator for moving the agitator circumferentially in the container.

11. An apparatus for separating solids from a liquid comprising a relatively shallow container of large diameter for containing the mixture of solids and liquid, a support adjacent the center of the container, an agitator connected to said support and extending to adjacent the periphery of the container and means connected to the outer end of the agitator for moving it circumferentially in the container.

12. An apparatus for separating solids from a liquid comprising a relatively shallow container of large diameter for containing the mixture of liquid and solids, a support adjacent the center of the container, a curved agitator connected at one end to said support and extending to adjacent the periphery of the container and means connected to the outer end of the agitator for moving the agitator through the liquid.

13. An apparatus for separating solids from a liquid comprising a relatively shallow container of large diameter for containing the mixture of solids and liquid, a support adjacent the center of the container, a flexible agitator connected at one end to the support and extending to adjacent the periphery of the container and means connected to the outer end of the agitator for moving it through the liquid.

14. An apparatus for separating solids from a liquid comprising a relatively shallow container of large diameter for containing the mixture of solids and liquid, a support adjacent the center of the container, a floating member connected at one end to said support and extending to adjacent the periphery of the container and means for moving said member circumferentially in the container.

15. An apparatus for separating solids from a liquid comprising a relatively shallow container of large diameter for containing the mixture of solids and liquid, a support adjacent the center of the container, a tractor movable around the periphery of the container and a floating member connected at one end to the support and at the other end to the tractor.

16. An apparatus for separating solids from a liquid comprising a relatively shallow container of large diameter for containing the mixture of solids and liquid, means in the liquid and spaced from the bottom of the container adapted to be moved to cause movement of a portion of the liquid toward a selected point in the container, the movement of the liquid serving to deposit solids at said point and means for removing the collected solids.

17. An apparatus for separating solids from a liquid comprising a relatively shallow container of large diameter for containing the mixture of liquid and solids, means movable in the liquid to produce currents therein toward a selected point in the container, said currents serving to separate solids from the liquid and convey them toward and deposit them at said point and means for removing the collected solids.

18. An apparatus for separating solids from a liquid comprising a relatively shallow container of large diameter for containing the mixture of solids and liquid, means movable circumferentially in said container and spaced from the bottom thereof for producing agitation of the liquid to place the said solids in suspension and to produce currents in the liquid toward a selected point whereby the solids are separated from the liquid and deposited at said point and means for removing the collected solids.

19. An apparatus for separating solids from a liquid comprising a relatively shallow container of large diameter for containing the mixture of solids and liquid, a curved floating member extending from adjacent the center to adjacent the periphery of the container, means at the periphery of the container for moving said member about said center and a pump connected on its intake side to the container adjacent the center thereof.

20. An apparatus for separating solids from a liquid comprising a container for receiving the liquid mixture, a floating agitator in said container, and means for moving said agitator to agitate said liquid, the agitator being positioned with its advancing edge disposed angularly to its direction of movement.

21. An apparatus for separating solids from a liquid comprising a relatively large shallow container, a relatively fixed support, an agitator in said container having one end connected to said support, and means connected to the other end of said agitator for moving the same relative to said support in a horizontal plane.

22. An apparatus for separating solids from a liquid comprising a relatively large shallow container, a fixed support, a curved agitator having one end connected to said support and means for moving said agitator in a horizontal plane.

In testimony whereof, I have hereunto set my hand.

GEORGE B. BURNHAM.